US011206276B2

(12) United States Patent
Nitz et al.

(10) Patent No.: US 11,206,276 B2
(45) Date of Patent: Dec. 21, 2021

(54) CYBER SECURITY USING HOST AGENT(S), A NETWORK FLOW CORRELATOR, AND DYNAMIC POLICY ENFORCEMENT

(71) Applicant: SRI International, Menlo Park, CA (US)

(72) Inventors: Kenneth C. Nitz, Redwood City, CA (US); Phillip Porras, Cupertino, CA (US); Steven Cheung, San Francisco, CA (US)

(73) Assignee: SRI International, Menlo Park, CA (US)

( * ) Notice: Subject to any disclaimer, the term of this patent is extended or adjusted under 35 U.S.C. 154(b) by 274 days.

(21) Appl. No.: 16/430,185

(22) Filed: Jun. 3, 2019

(65) Prior Publication Data

US 2020/0228553 A1 Jul. 16, 2020

Related U.S. Application Data

(60) Provisional application No. 62/793,287, filed on Jan. 16, 2019.

(51) Int. Cl.
*H04L 29/06* (2006.01)
(52) U.S. Cl.
CPC ...... *H04L 63/1425* (2013.01); *H04L 63/0236* (2013.01); *H04L 63/20* (2013.01)
(58) Field of Classification Search
CPC .. H04L 63/0236; H04L 63/1425; H04L 63/20
See application file for complete search history.

(56) References Cited

U.S. PATENT DOCUMENTS

| 8,875,223 | B1* | 10/2014 | Chen | G06F 21/6272 |
| | | | | 726/1 |
| 2009/0178139 | A1* | 7/2009 | Stute | G06Q 10/109 |
| | | | | 726/22 |
| 2009/0290492 | A1* | 11/2009 | Wood | H04L 43/18 |
| | | | | 370/235 |
| 2010/0064353 | A1* | 3/2010 | Kan | H04L 63/1408 |
| | | | | 726/5 |
| 2017/0041297 | A1* | 2/2017 | Ling | H04L 63/061 |

(Continued)

*Primary Examiner* — Joseph P Hirl
*Assistant Examiner* — Ka Shan Choy
(74) *Attorney, Agent, or Firm* — Rutan & Tucker, LLP

(57) ABSTRACT

A correlator that includes a number of modules cooperating with each other. A transaction correlation module correlates network flow information for one or more network packet flows corresponding to one or more host-agent network-transaction records on whom participated in a network packet flow. The host-agent network-transaction records at least contain source information. A host input module to take in the host-agent network-transaction records from each host agent on its host computing device connecting to the correlator. A merged record creator creates a merged record for corresponding matches of one or more of the host-agent network-transaction records to one or more of the network packet flows. The merged record gives the network policy enforcement module a complete picture of both the network traffic flow information along with the source information that participated in the network packet flows in order to apply network polices against the network packet flows.

20 Claims, 10 Drawing Sheets

(56) References Cited

U.S. PATENT DOCUMENTS

2017/0142144 A1* 5/2017 Weinberger ............ G06F 21/552
2019/0081983 A1* 3/2019 Teal ........................ G06F 21/50
2021/0112102 A1* 4/2021 Anderson ............ H04L 41/0893

* cited by examiner

Example Host Agent Record            130

1. HOST AGENT, 1451
2. 1472062019,
3. 192.168.0.1,12345,23.100.86.91,443,tcp,,
4. edward,2121,
5. edward-laptop.example.com,
6. 8353,Microsoft PowerPoint,
7. /Applications/Microsoft PowerPoint.app/Contents/MacOS/Microsoft PowerPoint,
/Applications/Microsoft PowerPoint.app/Contents/MacOS/Microsoft PowerPoint::psn_0_577677,,
8. /Users/edward/Honeytrap /secret.pptx::/Users/edward/Honeytrap/~$secret.ppt x,"
9. HA,0.1

1. Host agent ID
2. timestamp,
3. local IP, local port, remote IP, remote port, protocol, state,
4. username, user ID,
5. hostname,
6. process ID, app name,
7. exec path, exec arg list,
8. open file list,
9. sensor ID, sensor version

Figure 5

Host Agent Record

HOSTAGENT 120

- timestamp
- localIP
- localPort
- remoteIP
- remotePort
- protocol
- state
- username
- userID
- agenthostname
- processID
- appname
- execpath
- execArguments
- execCredential
- openFileList
- integrity
- pProcessID
- pAppname
- pExecPath
- sensorID
- sensorVer

Figure 6

160    Merged flow record and host agent record to produce merged record

Flow State
- Init, Update, CL_Rst, SV_Rst, Timeout

Application
- Src TCP/UDP port
- Dst TCP/UDP port
- Src Payload (N bytes)
- Dst Payload (N bytes)

Usage
- Src/Dst zero packet cnt
- Src/Dst data packet cnt
- Src/Dst avg packet size
- Src/Dst total bytes
- Src/Dst total packets
- ICMP Packet Count

Time
- Start time
- End time
- Flow duration

From/To
- Source IP
- Destination IP
- VLAN List

Flow Update Stats
- Bytes
- Packets
- seconds

Participant Info
- Src/Dst domain
- Src/Dst country
- Src/Dst city
- Src/Dst longitude
- Src/Dst latitude

HostApp
- username
- userID
- hostname
- processID
- appname
- execpath
- execArguments
- execCredential
- openFileList
- integrity
- sensorID
- sensorVer

Figure 7

Network Correlator Outputs Merged Record to Policy Enforcement Module

- FLOW
- *local_time_entered*
- srcIP
- srcPort
- dstIP
- dstPort
- start
- end
- duration
- protocol
- state
- srcZeropaks
- srcDatapaks
- srcAvgpak
- SRIFlow

- srcBytecnt
- srcPakcnt
- dstZeropaks
- dstDatapaks
- dstAvgpak
- dstBytecnt
- dstPakcnt
- updateTime
- updateSrcBytecnt
- updateSrcPakcnt
- updateDstBytecnt
- updateDstPakcnt
- icmpPakcnt
- vlan

*Network Correlator*

- srcPrefix
- dstPrefix
- srcDomain
- dstDomain
- srcCountry
- srcCity
- dstCountry
- dstCity
- srcLatitude
- srcLongitude
- dstLatitude
- dstLongitude
- *username*
- *userID*

170

- *agenthostname*
- *processID*
- *appname*
- *execpath*
- *execArguments*
- *execCredential*
- *openFileList*
- *integrity*
- *pProcessID*
- *pAppname*
- *pExecPath*
- *sensorID*
- *sensorVer*

*Host Agent*

Figure 8

CYBER SECURITY USING HOST AGENT(S), A NETWORK FLOW CORRELATOR, AND DYNAMIC POLICY ENFORCEMENT

CROSS-REFERENCE

This application claims the benefit of and priority under 35 USC 119 to U.S. provisional patent application Ser. No. 62/793,287, titled "Cyber security using host agent(s), a network flow correlator, and ProcessBoss," filed: 16 Jan. 2019, which is incorporated herein by reference in its entirety.

GOVERNMENT LICENSE RIGHTS

This invention was made with Government support under agreement FA8750-16-C-0231 by the Air Force. The Government has certain rights in this invention.

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

TECHNICAL FIELD

Embodiments of this disclosure relate generally to cyber security. In an embodiment, the design relates to a network flow correlator and network policy enforcement.

BACKGROUND

In computer security, having actionable information and knowing what files and data are being exfiltrated is important, but in general all we see are the network flows of data, not what is happening on individual computers and servers that might be exfiltrating data and information.

There are virus scanners and other techniques that can identify threats that could be dangerous, but do not actually catch a threat in the act and apply a network policy to counter this threat.

SUMMARY

Provided herein can be various methods, apparatuses, and systems for cyber security. In an embodiment, a correlator that includes a number of modules cooperating with each other. A transaction correlation module correlates network flow information for one or more network packet flows corresponding to one or more host-agent network-transaction records on whom participated in a given network packet flow. The host-agent network-transaction records at least contain source information. A host input module to take in the host-agent network-transaction records over a host network from each host agent on its host-computing device connecting to the correlator. A merged record creator creates a merged record for each corresponding match of one or more of the host-agent network-transaction records to one or more of the network packet flows. The merged record contains both details of network flow information from a matching network packet flow and details of source information from a corresponding host-agent network-transaction record. The output module sends the merged record containing the network flow information and the source information onto a network policy enforcement module to give the network policy enforcement module a complete picture of both the network traffic flow information along with the source information that participated in one or more of the network packet flows in order to apply one or more network polices against the one or more network packet flows.

These and many other features are discussed.

DRAWINGS

FIG. 1 illustrates a block diagram of an embodiment of an example correlator to merge and pass network flow information and source information onto a network policy enforcement module to give the network policy enforcement module a complete picture of both the network traffic flow information along with the source information that participated in one or more of the network packet flows in order to apply one or more network polices against the one or more network packet flows.

Figure 4:
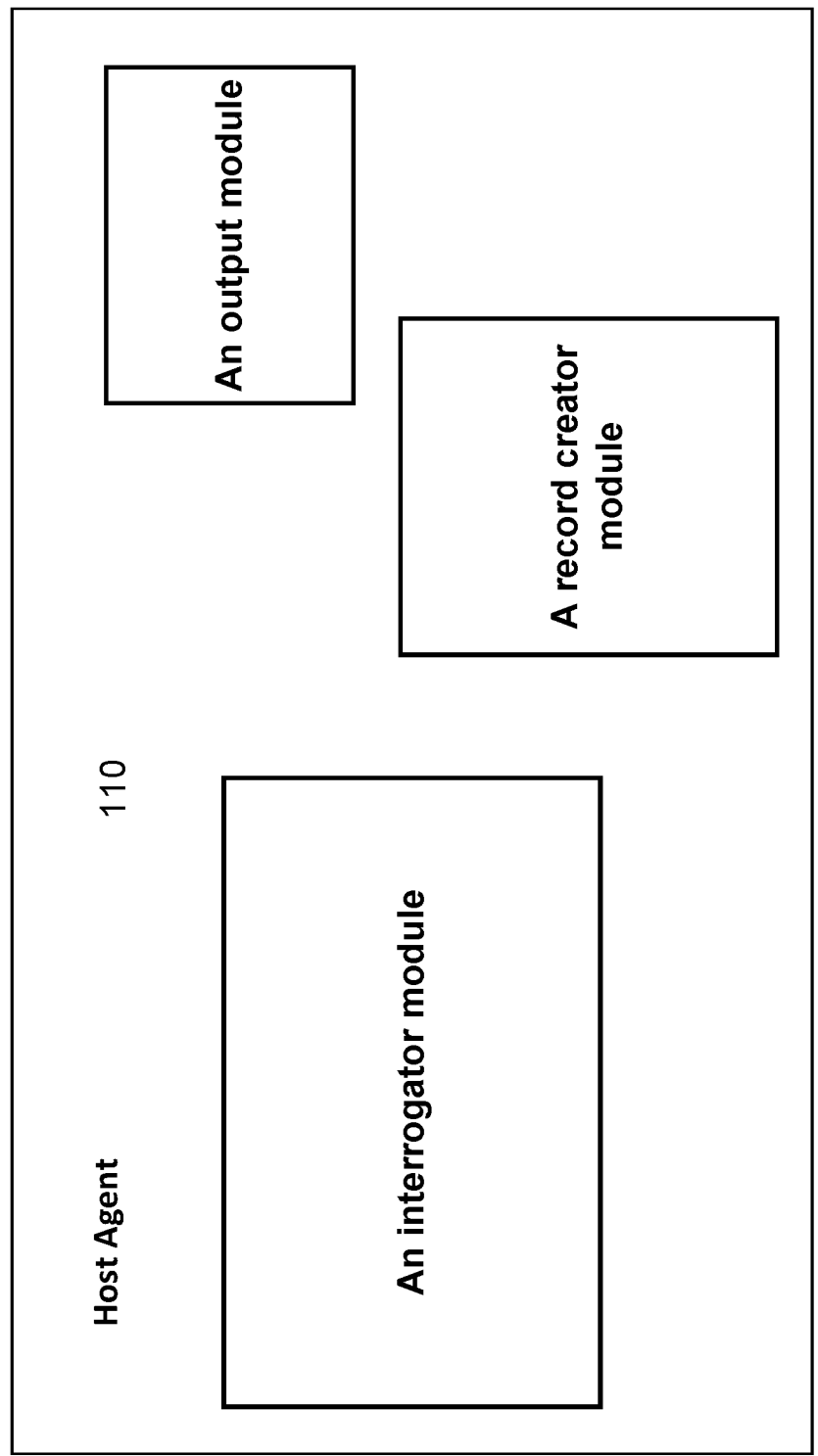

FIG. 4 illustrates an embodiment of block diagram of an example host agent on its host computing device with an audit module interrogating any of i) an Operating System on its computing host device and ii) a hypervisor of a virtual machine on its host computing device, to obtain and collect the source information details on each local application and associated user on that particular host computing device that creates or receives a new network packet flow with a network connection having an IP address external to a host network.

FIGS. 5 and 6 illustrate example embodiments of a host-agent network-transaction record with source information on whom participated in a network packet flow and a summary of the sensitivity of data/files/directories accessed.

FIGS. 7 and 8 illustrate example embodiments of a merged record for a match of one or more of the host-agent network-transaction records to one or more of the network packet flows, where the merged record contains both details of network flow information from a matching network packet flow and details of source information from a corresponding host-agent network-transaction record.

Figure 9:
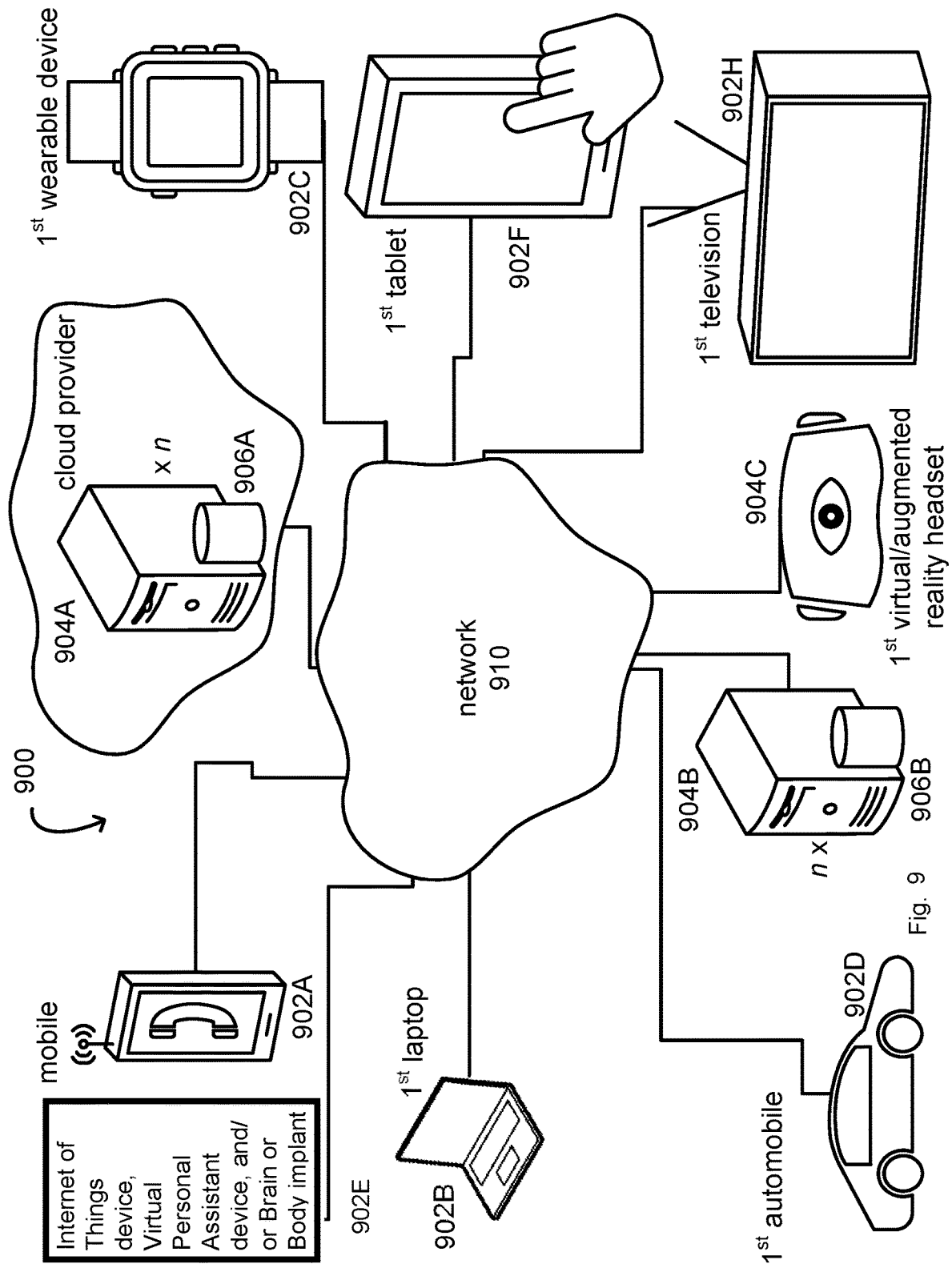

FIG. 9 illustrates a number of electronic systems and devices communicating with each other in a network environment in accordance with an embodiment of the design discussed herein.

Figure 10:
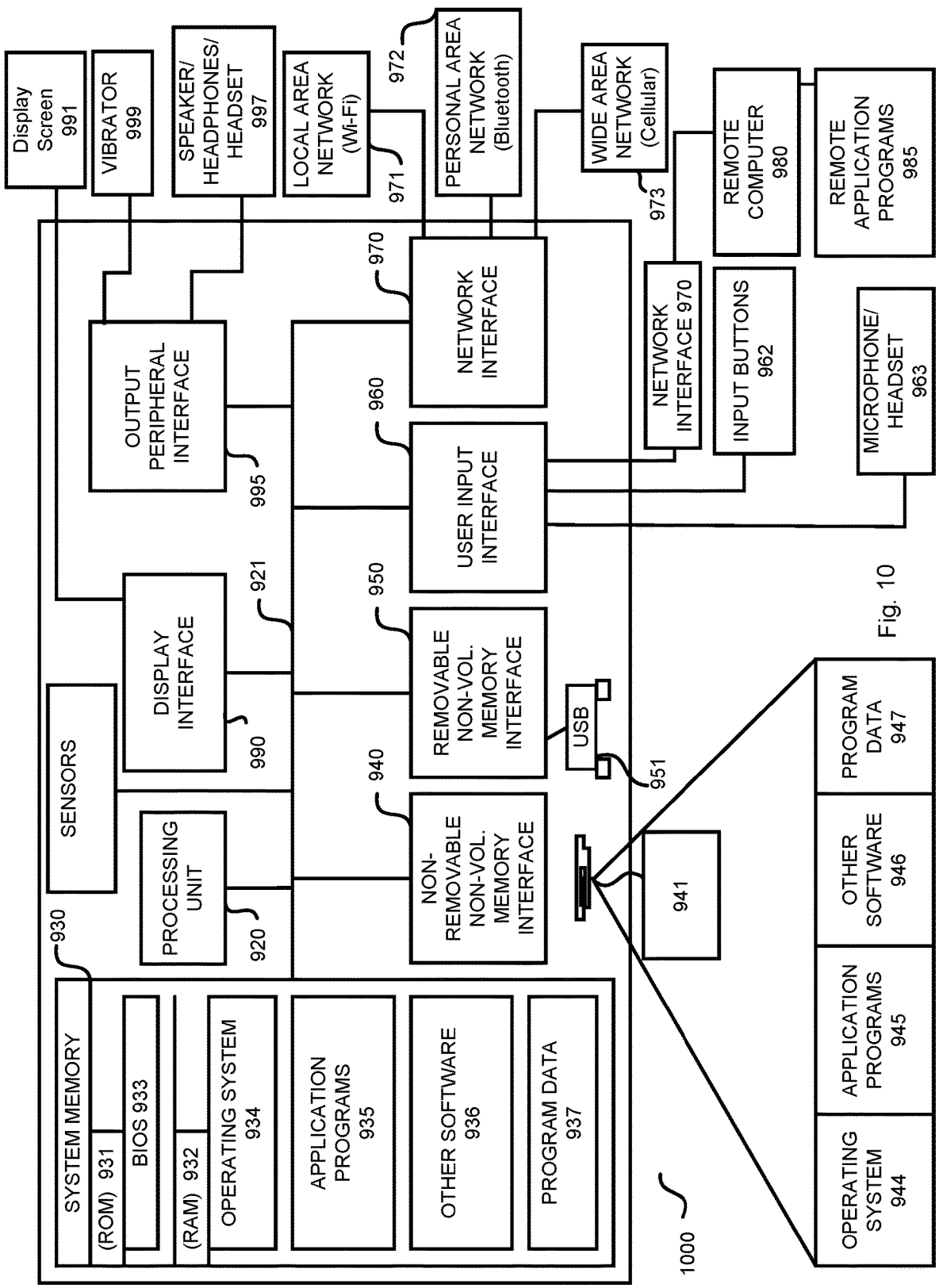

FIG. 10 illustrates a computing system that can be, wholly or partially, part of one or more of the server or client computing devices in accordance with an embodiment of the design discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details can be set forth, such as examples of specific data signals, named components, number of frames, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first server, can be made. However, the specific numeric reference should not be interpreted as a literal sequential order but rather interpreted that the first server is different than a second server. Thus, the specific details set forth can be merely exemplary. The specific details can be varied from and still be contemplated to be within the spirit and scope of the present design. The term "coupled" is defined as meaning connected either directly to the component or indirectly to the component through another component.

Figure 1:
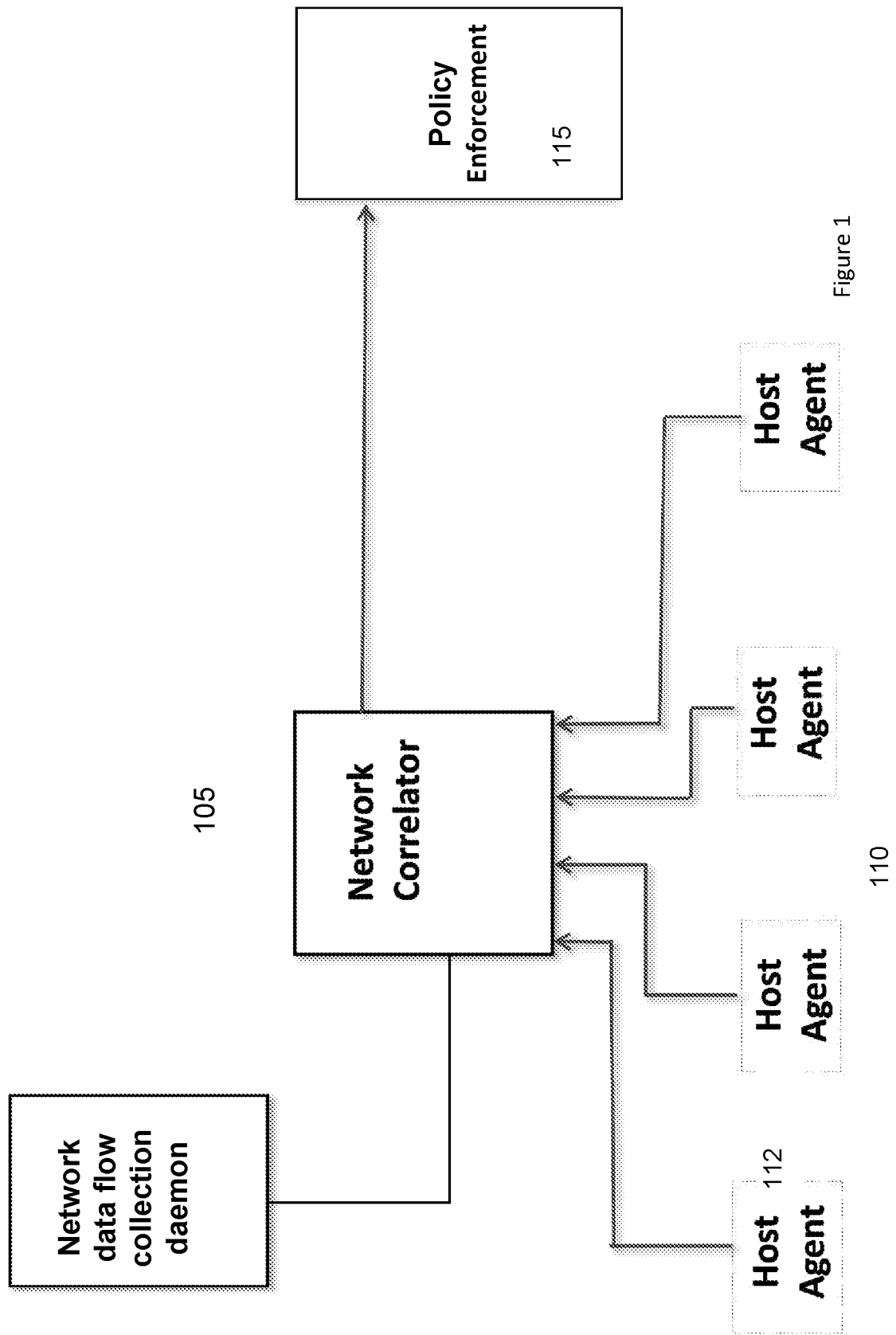

FIG. 1 illustrates a block diagram of an embodiment of an example correlator to merge and pass network flow information and source information onto a network policy enforcement module to give the network policy enforcement module a complete picture of both the network traffic flow information along with the source information that participated in one or more of the network packet flows in order to apply one or more network polices against the one or more network packet flows.

The role of the correlator 105 (e.g. Network Transaction Correlator) is to correlate network data flow collection daemon records and host-agent network-transaction records.

The first part is to start up a thread in the network data flow module to connect to one or more network data flow collection daemons to accept data on network wide traffic transactions, such as Internet transactions. The network data flow collection daemon (e.g. SRIFlow) monitors network traffic. The network data flow collection daemon produces network flow records for both TCP and UDP flows. The data on the traffic transactions comes in from the one or more network data flow collection daemons and contains a lot of information including metadata on each network packet flow.

The second part is to allow connections to each host agent 110, such as a first agent 112, so that they can send their process information via host-agent network-transaction records. The correlator 105 collects all the host-agent network-transaction records coming from host computing devices such as computers, laptops, smart phones, servers, IoT devices, Cloud networks, etc. with a host agent 110 on that host computing device.

The third part is for a transaction correlation module to correlate these host-agent network-transaction records with the data on the traffic transactions and send its corresponding record onto the network policy enforcement module 115 (e.g. ProcessBoss). The correlator 105 takes in the host agent data from each host agent 110 (there can be many of these) as well as the data from one or more network data flow collection daemons to create new merged records by correlating, for example, 5 tuples (e.g. the IP addresses and ports of the data) between the data from the network data flow collection daemon and the record from the host agent 110. The correlator 105 then combines the data from both and sends a new merged record on to the network policy enforcement module 115. The network policy enforcement module 115 allows policies to be made and run against the network flows as well as data coming from the host agents 110. The network policy enforcement module 115 can now use the data from fields from the host-agent network-transaction record in its policies.

Accordingly, this means, for example, that the network policy enforcement module 115 can look for 1) specific types of files (e.g. .docx, .ppt) and/or 2) locations of files (*/secretLegalDirectory/*) being exfiltrated and/or 3) programs/applications being executed on host computers in connection with the corresponding network packet flows to dynamically act to enforce policies against these network packet flows. The network policy enforcement module 115 because of the data from the host-agent network-transaction record can see the processes and files being used by a specific user on each monitored computing device and/or virtual machine. The correlator 105 can run on the same computing machine as the network policy enforcement module 115 or a different one.

The transaction correlation module correlates network flow information for one or more of the network packet flows corresponding to one or more host-agent network-transaction records, and then the output module sends the merged record containing the network flow information and the source information onto the network policy enforcement module 115 on a dynamic basis/real time to provide this combination of information so that the network policy enforcement module 115 can apply its policy rules to decide whether one or more of the network flows should be granted passage or should have restrictions placed on its passage through the host network, to or from, the IP address external to the host network.

Figure 3:
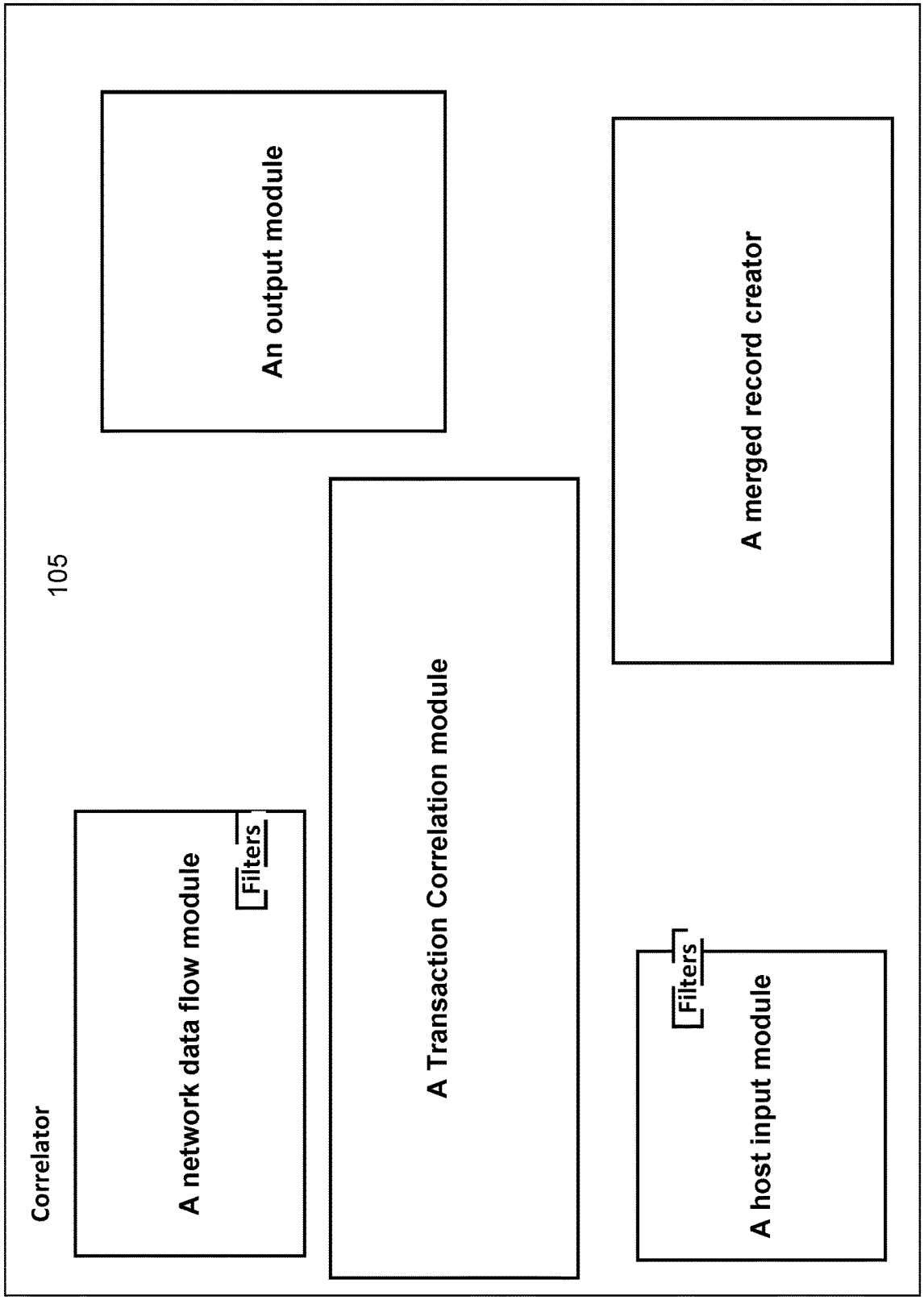
FIG. 3 illustrates an embodiment of block diagram of an example correlator that includes a number of modules cooperating with each other.

FIG. 3 illustrates an embodiment of block diagram of an example correlator that includes a number of modules cooperating with each other. The example modules of the correlator 105 may include a transaction correlation module, a host input module, a network data flow module, a transaction correlation module, a merged record creator, an output module, and other similar modules.

The host input module has one or more inputs (ports/sockets) to take in host-agent network-transaction records from each host agent on its host computing device connecting to the correlator 105. The host input module generally takes in host-agent network-transaction records over a host network from multiple host agents. For example (see FIGS. 1 and 2), the host input module can take in a first set of host-agent network-transaction records from a first host agent on a first host computing device, a second set of host-agent network-transaction records from a second host agent on second host computing device, and so on for each host computing device and/or virtual machine. Note, the host input module cooperates with the merged record creator to create one or more queues to store a plurality of host-agent network-transaction records from multiple host agents, including the first host agent and the second host agent, cooperating with the transaction correlation module. The host input module can use a thread to accept and store the data from the host agents. In an embodiment, when a new host agent sends a communication to announce itself to the host input module, then host input module can generate a separate thread, per host agent, to handle the data and records from that host agent.

Figure 2:
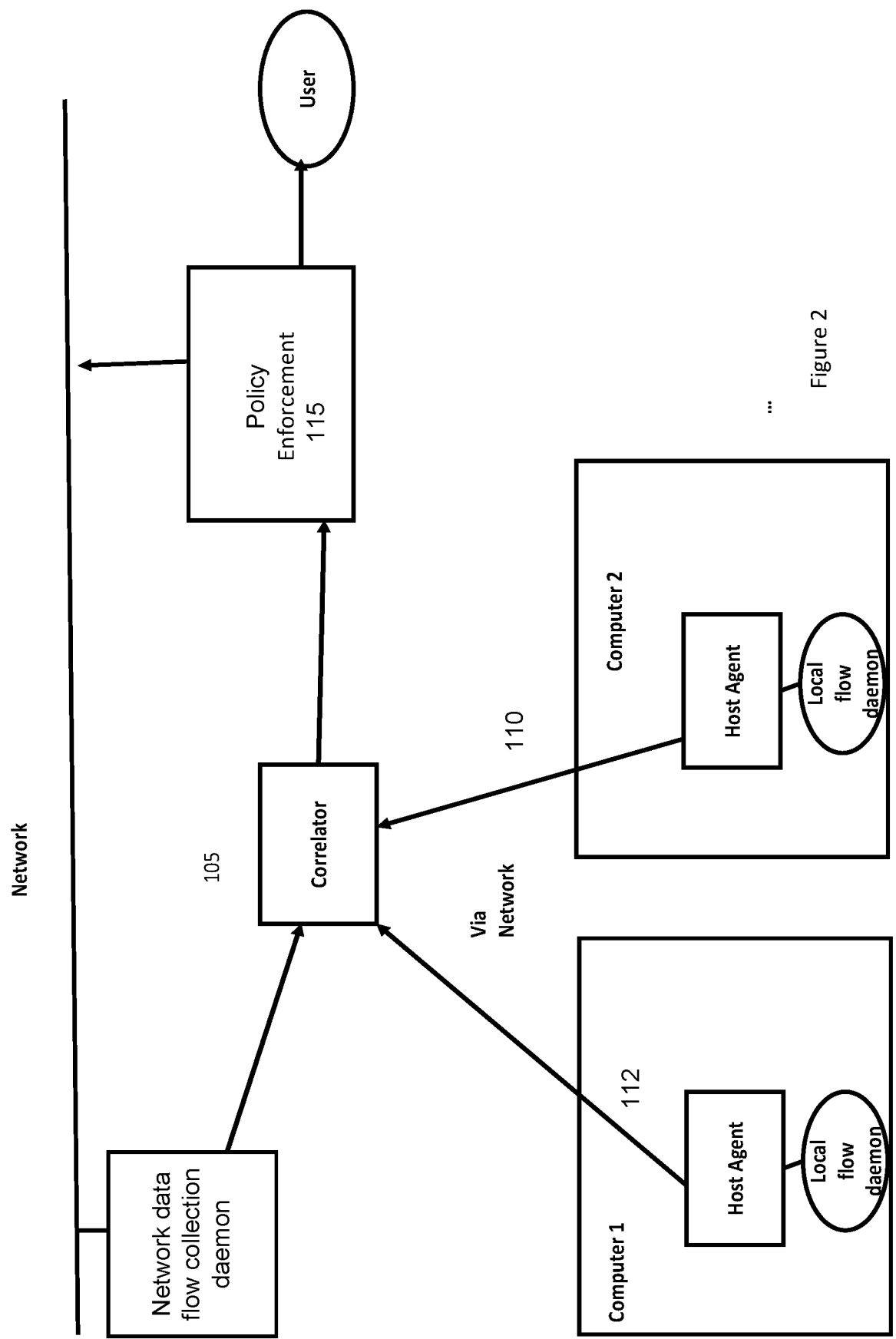
FIG. 2 illustrates an embodiment of block diagram of an example set of host agents on their host computing devices cooperating with a correlator and a network policy enforcement module.

FIG. 2 illustrates an embodiment of block diagram of an example set of host agents 110 on their host computing devices cooperating with a correlator and a network policy enforcement module.

Referring to FIG. 3, a network data flow module may have one or more inputs (ports/sockets being monitored) to take in the network data traffic flow information, including its associated meta data, for the one or more network packet flows from one or more network data flow collection daemons (e.g. SRIFlow). Each network data flow collection daemon can read, for example, Internet packets from a tap device or dump file, and then produce flow descriptions summarizing the network traffic. The network data flow module uses this network flow information for each of the network packet flows. The network data flow module can use a thread to find and connect with a network data flow collection daemon to collect its data and records. The network data flow module can use threads to create one or more storage mechanisms, (e.g. lists/tables) to store details for the one or more network data flows and their associated metadata including time stamps into a memory and/or cache. The network data flow module can also use a user programmable filter for the network data flow module programmable to remove the details of one or more of the network data flows from the storage mechanisms as space is needed, based on a set time limit, and any combination of both of these.

The transaction correlation module correlates network flow information for one or more network packet flows corresponding to one or more host-agent network-transaction records on whom participated (e.g. created and/or received) in a given network packet flow. Generally, an example first host-agent network-transaction record will correspond to a first network packet flow. The one or more host-agent network-transaction records at least contain source information. The source information can include i) an application that caused the one or more network packet flows, ii) a user tied to the one or more network packet flows, and iii) a combination of the application information and the user information for the one or more network packet flows.

The transaction correlation module can correlate network flow information for one or more network packet flows to a corresponding host-agent network-transaction record who generated that network flow by matching enough metadata characteristics between the network flow information and details in the corresponding one or more host-agent network-transaction records to satisfy a threshold level of correlation. (See FIGS. 5-8 for some example details in the network flow information and a host-agent network-transaction record.)

Accordingly, a correlation thread can sweep through the stored records of host-agent network-transaction records and stored details of one or more network packet flows to correlate and match up records from the network data flow collection daemons and from the host agents.

Correlating Records

The transaction correlation module can at least use a five-tuple of information technique to match records from the network data flow collection daemons and host agents. Note, the 5-tuples can refer to a set of five different values that comprise a Transmission Control Protocol/Internet Protocol (TCP/IP) connection: a source IP address/port number, destination IP address/port number, and the protocol in use. Both records should indicate the same protocol, IP addresses and same port numbers on their records so matching these metadata points to establish a minimum threshold of correlation should be reasonably fast. Time, e.g. time duration and/or start—stop times, can be another indicator, but because the time on a host agent may be asynchronous/different than on the network data flow collection daemon or the correlator 105, then the correlator 105 can handle matching by either saying it is a match if the time is within 'X' milliseconds, or the correlator 105 can ping the host agents or create a heartbeat out of the host agent indicating the current time, and receive the indicated times inserted by the host agent, and then map this offset in the correlator 105 to use this offset when matching the time. Thus, the correlator 105 can use a correlator time field thread in case the time field on the host computing device is different or not synchronized with either the network data flow collection daemon or with the correlator 105. Note, many other details can be used to match up metadata details and correlate network packet flows to corresponding host-agent network-transaction records. (See FIGS. 5-8 for some example details in the network flow information and a host-agent network-transaction record.)

The merged record creator can create and temporally store for a fixed duration of time a merged record (e.g. superflow record). The merged record creator creates a merged record for each of the corresponding matches of the one or more host-agent network-transaction records to the one or more network packet flows. The merged record contains both details of network flow information from a matching network packet flow and details of source information from a corresponding host-agent network-transaction record(s). (See FIGS. 7 and 8 for example details in a merged record) In an example, a merged record creation thread can sweep through the stored records and create a new merged record of simply the combination of network data flow record from the network data flow collection daemon and the host-agent network-transaction record from the host agent, and then send the merged record on to the network policy enforcement module for policy analysis.

The merged record is created by merging at least some of the pertinent information from network data flow collection daemon and the host agent. Duplicate information details will be always be removed/not duplicated on the information sent to the network policy enforcement module. The merged record creator can use a standard merged record template but may also use different merged record templates depending upon what is happening on the computer where the host agent lives.

The output module is configured to send the merged record containing the network flow information and the source information onto a network policy enforcement module to give the network policy enforcement module a complete picture of both the network traffic flow information along with the source information that participated in one or more network packet flows in order to apply one or more network polices against the one or more network packet flows.

The output module can spin up a thread to connect to the network policy enforcement module to send a new merged record and its data to the network policy enforcement module. The output module can be configured to send the merged record merely when a match is made with enough shared metadata characteristics to satisfy the threshold level of correlation in order to keep an amount of additional traffic and processing to a reasonable level. A threshold level of correlation can be a reasonable level of confidence that the network flow information and the host-agent network-transaction record match.

The network policy enforcement module (e.g. ProcessBoss) is configured to allow network policies to be made and run against the network packet flows in light of data coming from each host agent. The network policy enforcement module then can enforce those network policies against unauthorized exhilarated data transfers in a dynamic/real time fashion against the network packet flows before the network packet flow exits the network.

Remove 'Old' and/or 'No Longer Useful' Records

Note, the correlator 105 can use a separate sweep thread to sweep through all of the records to regularly remove old and/or no longer useful records. Although removing old records sounds simple, because the correlator 105 is constantly adding a constant stream of records from the network data flow collection daemon(s) and then records from each of the host agents connecting to that correlator 105, the correlator 105 needs to effectively removed stored information consider to be no longer timely or useful. The network policy enforcement module enforces its policies against the network packet flows in a dynamic/real time basis. Thus, the correlator 105 can store data and any records coming into a temporary storage area, remove records, reopen the streaming list, and add any temporary records, all while the correlating the records. The sweep thread can remove 'old' and/or 'no longer useful' records. For example, the sweep thread will continuously run to remove any records i) with a delta compared to a current time on the correlator 105 of 'Y' seconds, ii) already correlated records acknowledged as successfully received by the network policy enforcement module, iii) records from any host agent that is stopped or offline and deemed to can't have an active network flows left in the network, and iv) other records deemed to be no longer useful.

FIG. 4 illustrates an embodiment of block diagram of an example host agent on its host computing device with an audit module interrogating any of i) an Operating System on its computing host device and ii) a hypervisor of a virtual machine on its host computing device, to obtain and collect the source information details on each local application and associated user on that particular host computing device that creates or receives a new network packet flow with a network connection having an IP address external to a host network. A host agent, such as a first host agent 110, runs on each host computing device the system wants to monitor. The host agent's purpose is to create and deliver host-based network transaction records. Each instance of a host agent on its host computing device can include various modules, such as an audit module, a record creator module, an output module, and other similar modules.

A user configurable setting can be set to direct the audit module to interrogate the Operating System and/or a hypervisor. The setting allows the user to choose what is external to the entity that the audit module is monitoring; and thus, what is a network flow associated with something external, (i.e. external network, or external device, external to the local area where the sensor is located, etc.) The boundary of what is considered external is not fixed. The audit module is configured to interrogate any of i) an Operating System on its computing host device and ii) a hypervisor of a virtual machine on its host computing device, per the environment the host agent is deployed in, in order to obtain and collect the source information details for network flows. The source information details are collected on each local application and generally each user on that particular host computing device. The source information details are collected when at least one of the following occurs: i) an application initiates/creates a new network packet flow with a network connection having an IP address external to a host network containing the correlator and host computing device and ii) an application receives a new network packet flow from a network connection having an IP address external to a host network containing the correlator and the host computing device. The audit module can interrogate and examine tables and registries in the OS/hypervisor to see if the network packet flow will be either internal to the host computing device and/or internal to the host network. If so, the network packet flow will be ignored. If not, this will be a network packet flow with, an inbound or outbound network connection, that has an IP address external to a host network. As such, the policy enforcement module at the edge of the network should apply network policies against this new network packet flow with a complete picture of the nature of this new network packet flow.

Another way is for the user to define anything external to the host machine. Another way is to define it as anything external to the internal network (hosts that you trust)— where you don't have authority. Another way is for the user to define anything external is based on where the sensor is located in order to determine when a trigger to interrogate is detected.

The host agent can include a local version of a data flow collection daemon for its own local flow monitoring use.

The record creator module is configured to cooperate with the audit module to create a new host-agent network-transaction record each time when that host agent creates and/or receives the new network packet flow with the network connection having the IP address external to the host network. Thus, the host agent creates a new record when 1) a new connection to an external IP address is created to or received from, or
2) a set of sensitive files, data types, and/or directories are accessed corresponding to a network connection with external IP address.

An instance of the host agent is configured to obtain and insert into each host-agent network-transaction record at least all five of i) identifying an application participating in the new network connection, ii) identifying user information tied to the new network packet flow, iii) an indication of data, directories, and/or files accessed in connection with the new network packet flow so that a check on a sensitivity of the data and/or files accessed can be made, iv) identifying of a corresponding host agent and/or host device where the network connection occurred, as well as v) identifying details on the new network packet flow coming through the network connection itself (e.g., flow endpoints and protocol).

The host agent monitors and tracks i) applications, including processes, apps, etc., ii) user activities and iii) files, data, and directories accessed pertaining to network flow activities with an external IP address. The host agent captures the identity of local network flow participants, and provides a summary of the sensitive data/files/directories accessed (e.g. involved with) the application prior to its engagement in the network transaction. The host agent generates host-agent network-transaction records, including network flow information (e.g., flow endpoints and protocol), user information (e.g., username/ID), application information (e.g., app name, path, and argument list), and a list of sensitive files and/or directories accessed.

The host agent has one or more configurable filters programmable through a user interface on the host computing device that limit an amount of making host agent network-transaction records, which is tailorable to specific processor and storage capabilities of the host computing device and the correlator, by filtering out at least one of i) one or more time frames and ii) one or more directories, file types, and/or data types that would not trigger generation of a new host agent network-transaction record. The filter can also help in making practical network policies by being able to tailor what is being filtered out on each host device.

A first example user programmable filter can be utilized to program one or more time frames when the record creator module will not create the new host agent network-transaction record associated with one or more specified applications. For example, the first user programmable filter can set one or more programmable time frames, such as during a routine daily archiving or backup session to an external IP address, to stop and filter out making records during this scheduled time. This can significantly reduce the amount of not relevant records generated as well as save the processing and storage capabilities to create all of those not relevant records.

A second example user programmable filter can be utilized to program which i) directories, ii) data types, iii) file types, and iv) any combination of these three on that specific host computing device where the network connections with the external IP address will not trigger a generation of the new host agent record.

The host agent can detect network transaction events potentially using a local instance of a network data flow collection daemon, which reports transactions at connection initialization, during update intervals, and at connection closure (due to FIN, Timeout, or Reset).

Overall, the host agent produces a network transaction record each time a process within the host performs a network flow with an external IP address (local network transactions and other programmable aspects are excluded). These network transaction types can include TCP accept, TCP connect, TCP close, UDP send/receive, TCP reset and UDP close.

The output module cooperates with the record creator module to send the new host-agent network-transaction record to the host input module of the correlator. For example, see FIG. 2, a first output module of a first host agent and a second output module of a second host agent are each configured to send one or more of the host-agent network-transaction records to the host input module of the correlator. The host agent forwards these host-agent network-transaction records to the correlator to merge with network flow data.

Host network transaction records are later merged by the correlator with network data flow collection daemon records. The merged record from the correlator provides the network policy enforcement module with a complete picture of both the network flow along with a detailed account of the local host process that participated in the flow. The host agent can report open matches for sensitive files, data, users, computing devices, directories, etc. that are relevant within a given system's network policies. For example, with the addition of the parent application information, the network policy enforcement module can see, for example, if an email client has fired off a browser connection or direct app connection that connects to a bad website, or sends a file (even if just attached to the e-mail) it should not, which could occur in a phishing attack, etc.

FIGS. 5 and 6 illustrate example embodiments of a host-agent network-transaction record with source information on whom participated in a network packet flow and a summary of the sensitivity of data/files/directories accessed. A host-agent network transaction record can be used to capture the identity of local network flow participants, and to provide a summary of the sensitive data/files/directories accessed by the process prior to and during its engagement in the network transaction. The sensitive data access can refer to an abbreviated enumeration of sensitive data files that have been accessed by the process up to and including the moment that the network transaction's interaction with these files/data types took place.

An example implementation of a host-agent network transaction record 120 in FIG. 6 can be a CSV formatted record that is composed of the following fields:

Username—User account name under which the process is operating

UserID—Local host user ID associated with the current process

Hostname—Local host name

ProcessID—Process ID of the current process

AppName—Name of the Application (e.g. Firefox)

OpenFileList—List of files that are currently opened by the process and which match a member of the File Group Macro list.

Remote IP—Address of remote network connection end point

Remote Port—Network UDP or TCP port of the remote network connection

Local IP—Local host IP address used for this network transaction

Local Port—Local UPD or TCP port used for this connection

Protocol—Network connection protocol (TCP/UDP)

ExecPath—Execution path of the process executable binary

Exec Credential—Digital credential of the executed binary

ExecArguments—Execution arguments invoked at process startup

Integrity—User defined field that captures provenance metrics

Version—Version ID of the host agent

PProcessID—Process ID of the parent process

PAppName—Name of the parent Application

PExecPath—Execution path of the parent process executable binary

SensorID—Sensor Identity of the host agent

SensorVer—Version of the host agent

Another example Host Agent Record 130 in FIG. 5 could have data in fields such as:
1. Host agent ID, for example, HOST AGENT, 1451
2. Timestamp, for example, 1472062019
3. local IP, local port, remote IP, remote port, protocol, state, for example, 192.168.0.1,12345,23.100.86.91, 443,tcp
4. Username, user ID, for example, Edward, 2121
5. Hostname, for example, 8353, Microsoft PowerPoint,
6. Process ID, app name, for example,
7. Exec path, exec arg list, for example, /Applications/ Microsoft PowerPoint.app/Contents/MacOS/Microsoft PowerPoint, /Applications/Microsoft PowerPoint.app/ Contents/MacOS/Microsoft PowerPoint:: psn_0_577677,
8. Open file list, for example, /Users/edward/Honeytrap/ secret.pptx::/Users/edward/Honeytrap/~$secret.pptx,
9. Sensor ID, sensor version, for example, HA, 0.1

FIGS. 7 and 8 illustrate example embodiments of a merged record for a match of one or more of the host-agent network-transaction records to one or more of the network packet flows, where the merged record contains both details of network flow information from a matching network packet flow and details of source information from a corresponding host-agent network-transaction record. As discussed the correlator outputs a merged record to a network policy enforcement module. Some example fields merged from the correlator into a merged record in 160 in FIG. 7 can be as follows:

Some example fields merged from the Host Agent Record can be as follows:

username; userID; agenthostname; processID; appname; execpath; execArguments; execCredential; openFileList; integrity; pProcessID; pAppname; pExecPath; sensorID; and sensorVer.

Some example fields merged from the network flow information can be as follows:
Flow State
    Init, Update, CL_Rst, SV_Rst, Timeout
From/To
    Source IP
    Destination IP
    VLAN List
Time
    Start time
    End time
    Flow duration
Application
    Src TCP/UDP port
    Dst TCP/UDP port
    Src Payload (N bytes)
    Dst Payload (N bytes)
Flow Update Stats
    Bytes
    Packets
    seconds
Usage
    Src/Dst zero packet cnt
    Src/Dst data packet cnt
    Src/Dst avg packet size
    Src/Dst total bytes
    Src/Dst total packets
    ICMP Packet Count
Participant Info
    Src/Dst domain
    Src/Dst country
    Src/Dst city
    Src/Dst longitude
    Src/Dst latitude FIG. 8 shows another example a merged record 170. Some example fields that can be merged from data from a network data flow collection daemon can be as follows:
    local_time_entered, which is correlated and entered by the correlator.
    Merged data from the network flow can be as follows:
    FLOW; srcIP; srcPort; dstIP; dstPort; start; end; duration; protocol; state; srcZeropaks; srcDatapaks; srcAvgpak; srcBytecnt; srcPakcnt; dstZeropaks; dstDatapaks; dstAvgpak; dstBytecnt; dstPakcnt; updateTime; updateSrcBytecnt; updateSrcPakcnt; updateDstBytecnt; updateDstPakcnt; icmpPakcnt; vlan; srcPrefix; dstPrefix; srcDomain; dstDomain; srcCountry; srcCity; dstCountry; dstCity; srcLatitude; srcLongitude; dstLatitude; dstLongitude.

Similar fields are incorporated from the host-agent network-transaction record.
Network FIG. 9 illustrates a number of electronic systems and devices communicating with each other in a network environment in accordance with an embodiment of the design discussed herein. Portions of the modules can be located in the cloud provider platform 904 while other portions of the system including image sensors may be located on the client devices such as the mobile computing devices 902A-902F.

The network environment 900 has a communications network 910. The network 910 can include one or more networks selected from an optical network, a cellular network, the Internet, a Local Area Network ("LAN") including Wi-Fi, Bluetooth, etc., a Wide Area Network ("WAN"), a satellite network, a fiber network, a cable network, and combinations thereof. In an embodiment, the communications network 910 is the Internet. As shown, there may be many server computing systems and many client computing systems connected to each other via the communications network 910. However, it should be appreciated that, for example, a single client computing system can also be connected to a single server computing system. As such, this Figure illustrates any combination of server computing systems and client computing systems connected to each other via the communications network 910.

The communications network 910 can connect one or more server computing systems such as a first server computing system 904A, a second server computing system 904B, a virtual reality headset 904C, a first smart television 902H, etc., to each other and to at least one or more client computing systems as well. The server computing systems 904A and 904B can each optionally include organized data structures such as databases 906A and 906B. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 902A (e.g., smartphone with an Android-based operating system), a second mobile computing device 902E (e.g., smartphone with an iOS-based operating system), a first wearable electronic device 902C (e.g., a smartwatch), a first portable computer 902B (e.g., laptop computer), a third mobile computing device or second portable computer 902F (e.g., tablet with an Android- or iOS-based operating system), a smart device or system incorporated into a first smart automobile 902D, and the like. The client computing systems (e.g., 902A-902H) can include, for example, the software application and/or the hardware-based system in which the design discussed herein can be deployed.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication.

Any one or more of the server computing systems can be a cloud provider. A cloud provider can install and operate application software in a cloud (e.g., the network 910 such as the Internet), and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 2) the request and response cycle from a dedicated on-line server, 3) the request and response cycle directly between a native application resident on a client device and the cloud-based remote access to another client computing system, and 4) combinations of these.

In an embodiment, the server computing system 904A can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users), can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

Computing Systems

FIG. 10 illustrates a computing system that can be, wholly or partially, part of one or more of the server or client computing devices in accordance with an embodiment of the design discussed herein. With reference to FIG. 10, components of the computing system 1000 can include, but are not limited to, a processing unit 920 having one or more processing cores, a system memory 930, and a system bus 921 that couples various system components including the system memory 930 to the processing unit 920. The system bus 921 may be any of several types of bus structures selected from a memory bus or memory controller, a peripheral bus, and a local bus using any of a variety of bus architectures.

Computing system 1000 typically includes a variety of computing machine-readable media. Computing machine-readable media can be any available media that can be accessed by computing system 1000 and includes both volatile and nonvolatile media, and removable and non-removable media. The system memory 930 includes computer storage media in the form of volatile and/or nonvolatile memory such as read only memory (ROM) 931 and random access memory (RAM) 932. Transitory media such as wireless channels are not included in the machine-readable media. Communication media typically embody computer readable instructions, data structures, other executable software, or other transport mechanism and includes any information delivery media.

RAM 932 typically contains data and/or software that are immediately accessible to and/or presently being operated on by the processing unit 920. The RAM 932 can include a portion of the operating system 934, application programs 935, other executable software 936, and program data 937.

A user may enter commands and information into the computing system 1000 through input devices such as a keyboard, touchscreen, or software or hardware input buttons 962, a microphone 963, a pointing device and/or scrolling input component, such as a mouse, trackball or touch pad. The microphone 963 can cooperate with speech recognition software. These and other input devices are often connected to the processing unit 920 through a user input interface 960 that is coupled to the system bus 921, but can be connected by other interface and bus structures, such as a parallel port, game port, or a universal serial bus (USB). A display monitor 991 or other type of display screen device is also connected to the system bus 921 via an interface, such as a display interface 990. In addition to the monitor 991, computing devices may also include other peripheral output devices such as speakers 997, a vibrator 999, and other output devices, which may be connected through an output peripheral interface 995.

The computing system 1000 can operate in a networked environment using logical connections to one or more remote computers/client devices, such as a remote computing system 980. The remote computing system 980 can a personal computer, a hand-held device, a server, a router, a network PC, a peer device or other common network node, and typically includes many or all of the elements described above relative to the computing system 1000. The logical connections depicted in this Figure can include a personal area network ("PAN") 972 (e.g., Bluetooth®), a local area network ("LAN") 971 (e.g., Wi-Fi), and a wide area network ("WAN") 973 (e.g., cellular network), but may also include other networks. Such networking environments are commonplace in offices, enterprise-wide computer networks, intranets and the Internet. A browser application or other native application that cooperates directly with an application on a remote server may be resident on the computing device and stored in the memory.

When used in a LAN networking environment, the computing system 1000 is connected to the LAN 971 through a network interface or adapter 970, which can be, for example, a Bluetooth® or Wi-Fi adapter. When used in a WAN networking environment (e.g., Internet), the computing system 1000 typically includes some means for establishing communications over the WAN 973.

It should be noted that the present design can be carried out on a computing system such as that described with respect to FIG. 9 and FIG. 10. However, the present design can be carried out on a server, a computing device devoted to message handling, or on a distributed system in which different portions of the present design are carried out on different parts of the distributed computing system.

In an embodiment, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions but not transitory signals.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, Java, HTTP, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. An apparatus, comprising:
a correlator that includes a number of modules cooperating with each other, where the modules at least include,
a transaction correlation module configured to correlate network flow information for one or more network packet flows corresponding to one or more host-agent network-transaction records on whom participated in a first network packet flow, where the one or more host-agent network-transaction records at least contain source information selected from information that includes i) an application that caused the one or more network packet flows, ii) a user associated with the one or more network packet flows, and iii) a combination of the application information and the user information for the one or more network packet flows,
a host input module having one or more inputs to take in the one or more host-agent network-transaction records over a host network from each host agent on its host computing device connecting to the correlator,
a merged record creator configured to create a merged record for corresponding matches of one or more of the host-agent network-transaction records to one or more of the network packet flows, where the merged record contains both details of network flow information from a matching network packet flow and details of source information from a corresponding host-agent network-transaction record, and
an output module configured to send the merged record containing the network flow information and the source information to a network policy enforcement module to give the network policy enforcement module enough information of both the network traffic flow information along with the source information that participated in one or more of the network packet flows in order to apply one or more network policies against the one or more network packet flows.

2. The apparatus of claim 1, further comprising:
a network data flow module having one or more inputs to take in the network traffic flow information, including its associated meta data, for the one or more network packet flows from one or more network data flow collection daemons, where the network data flow module is configured to create one or more storage locations to store details for the one or more network data flows and their associated metadata including time stamps, and a user programmable filter for the network data flow module programmable to remove details of one or more of the one or more network data flows from the storage mechanisms as space is needed, based on a set time limit, when a match between the network packet flows and the one or more host-agent network-transaction records has been made, and any combination of both of these.

3. The apparatus of claim 1,
where the host input module is configured to take in a first host-agent network-transaction record from a first host agent on a first host computing device and a second host-agent network-transaction record from a second host agent on a second host computing device, and
where the host input module is configured to cooperate with the merged record creator to create one or more queues to store a plurality of host-agent network-transaction records from at least the first and second host agents.

4. The apparatus of claim 2, where the transaction correlation module is further configured to correlate network flow information for the one or more network packet flows to a corresponding host-agent network-transaction record who generated that network flow by matching enough metadata characteristics between the network flow information and details in the corresponding one or more host-agent network-transaction records to satisfy a threshold level of correlation.

5. The apparatus of claim 1, where each host agent on its host computing device includes
an audit module configured to interrogate any of i) an Operating System on its computing host device and ii) a hypervisor of a virtual machine on its host computing device, to obtain and collect the source information details on each local application on that particular host computing device that at least one of i) creates a new network packet flow with a network connection having an IP address external to the host network containing the correlator and host computing device and ii) receives the new network packet flow from the network connection having the IP address external to the host network containing the correlator and host computing device.

6. The apparatus of claim 5, where each host agent on its host computing device includes
an audit module that has a user configurable setting that can be set to direct the audit module to interrogate an Operating System and/or a hypervisor by allowing the user to choose what entity associated with a network flow is considered something external; and thus, an external entity that can trigger the audit module to interrogate the Operating System and/or the hypervisor.

7. The apparatus of claim 5, where a first host agent is configured to obtain and insert into a first host-agent network-transaction record at least two of i) identifying an application participating in the new network connection, ii) identifying user information tied to the new network packet flow, iii) an indication of data and/or files accessed in connection with the new network packet flow, iv) identifying of a corresponding host agent and/or host device where the network connection occurred, as well as v) identifying details on the new network packet flow coming through the network connection itself; and where the transaction correlation module correlates network flow information for one or more of the network packet flows corresponding to the first host-agent network-transaction record, and the output module sends the merged record containing the network flow information and the source information to the network policy enforcement module on a dynamic basis to provide this combination of information so that the network policy enforcement module can apply its policy rules to decide whether one or more of the network packet flows comply or not comply with a policy.

8. The apparatus of claim 1, where the host agent has one or more configurable filters programmable through a user interface on the host computing device that limit an amount of host agent network-transaction records that are made based on specific processor and storage capabilities of the host computing device and the correlator, by filtering out at least one of i) one or more time frames and ii) one or more directories, file types, and/or data types that would not trigger generation of a new host agent network-transaction record.

9. The apparatus of claim 8, where a first user programmable filter is utilized to program the one or more time frames when a record creator module will not create the new host agent network-transaction record associated with one or more specified applications.

10. The apparatus of claim 8, where a second user programmable filter is utilized to program which i) directories, ii) data types, iii) file types, and iv) any combination of these three, on that specific computing device where network connections with the external IP address will not trigger the generation of the new host agent record.

11. A method for a network correlator, comprising:

correlating network flow information for one or more network packet flows corresponding to one or more host-agent network-transaction records on whom participated in a first network packet flow, where the one or more host-agent network-transaction records at least contain source information selected from information that includes i) an application that caused the one or more network packet flows, ii) a user associated with the one or more network packet flows, and iii) a combination of the application information and the user information for the one or more network packet flows, taking in the one or more host-agent network-transaction records over a host network from each host agent on its host computing device connecting to the network correlator, creating a merged record for corresponding matches of one or more of the host-agent network-transaction records to one or more of the network packet flows, where the merged record contains both details of network flow information from a matching network packet flow and details of source information from a corresponding host-agent network-transaction record, and sending the merged record containing the network flow information and the source information onto a network policy enforcement module to give the network policy enforcement module enough information of both the network traffic flow information along with the source information that participated in one or more of the network packet flows in order to apply one or more network policies against the one or more network packet flows.

12. The method of claim 11, further comprising:

taking in the network data traffic flow information, including its associated metadata, for the one or more network packet flows from one or more network data flow collection daemons, storing details for the one or more network data flows and their associated metadata including time stamps, and programming to remove details of one or more of the one or more network data flows from storage locations as space is needed, based on a set time limit, and any combination of both of these.

13. The method of claim 12, further comprising:

correlating network flow information for the one or more network packet flows to a corresponding host-agent network-transaction record who generated that network flow by matching enough metadata characteristics between the network flow information and details in the corresponding one or more host-agent network-transaction records to satisfy a threshold level of correlation.

14. The method of claim 11, further comprising:

taking in a first host-agent network-transaction record from a first host agent on a first host computing device and a second host-agent network-transaction record from a second host agent on second host computing device; and creating one or more queues to store a plurality of host-agent network-transaction records from multiple host agents, including the first host agent and the second host agent, cooperating with the transaction correlation module.

15. The method of claim 11, where each host agent on its host computing device includes an audit module configured to interrogate any of i) an Operating System on its computing host device and ii) a hypervisor of a virtual machine on its host computing device, to obtain and collect the source information details on each local application on that particular host computing device that at least one of i) creates a new network packet flow with a network connection having an IP address external to the host network containing the correlator and host computing device and ii) receives the new network packet flow from the network connection having the IP address external to the host network containing the correlator and host computing device;

a record creator module configured to cooperate with the audit module to create the new host-agent network-transaction record each time when that host agent creates and/or receives the new network packet flow with the network connection having the IP address external to the host network; and an output module configured to cooperate with the record creator module to send the new host-agent network-transaction record to the host input module of the correlator, where a first output module of a first host agent and a second output module of a second host agent are each configured to send one or more of the host-agent network-transaction records to the host input module.

16. The method of claim 11, further comprising:
obtaining and inserting into a first host-agent network-transaction record at least all five of i) identifying an application participating in the new network connection, ii) identifying user information tied to the new network packet flow, iii) an indication of data and/or files accessed in connection with the new network packet flow, iv) identifying of a corresponding host agent and/or host device where the network connection occurred, as well as v) identifying details on the new network packet flow coming through the network connection itself; and correlating network flow information for one or more of the network packet flows corresponding to the first host-agent network-transaction record, and the output module sends the merged record containing the network flow information and the source information onto the network policy enforcement module cooperate on a dynamic basis to provide this combination of information so that the network policy enforcement module on a dynamic basis to provide this combination of information so that the network policy enforcement module can apply its policy rules to decide whether one or more of the network packet flows comply or not comply with a policy.

17. The method of claim 11, further comprising:
using programmable filters through a user interface on a host computing device that limit an amount of making host agent network-transaction records, which is based on specific processor and storage capabilities of the host computing device and the correlator, by filtering out at least one of i) one or more time frames and ii) one or more directories, file types, and/or data types that would not trigger generation of a new host agent network-transaction record.

18. The method of claim 17, where a first user programmable filter is utilized to program the one or more time frames when a record creator module will not create the new host agent network-transaction record associated with one or more specified applications.

19. The method of claim 17, where a second user programmable filter is utilized to program which i) directories, ii) data types, iii) file types, and iv) any combination of these three on that specific computing device where network connections with the external IP address will not trigger the generation of the new host agent record.

20. A non-transitory computer readable medium comprising computer readable code operable, when executed by one or more processing apparatuses in the computer system to instruct a computing device to perform the method of claim 11.

* * * * *